United States Patent
Truffaux

[11] Patent Number: 5,924,271
[45] Date of Patent: Jul. 20, 1999

[54] SYSTEM FOR PICKING CABBAGES

[75] Inventor: Hubert Truffaux, Boves, France

[73] Assignee: ABC Metal S.A.R.L., Harbonnieres, France

[21] Appl. No.: 08/736,185

[22] Filed: Oct. 24, 1996

[30] Foreign Application Priority Data

Oct. 26, 1995 [FR] France .................................. 95 12667

[51] Int. Cl.$^6$ ............................................. A01D 45/00
[52] U.S. Cl. ......................................................... 56/327.1
[58] Field of Search ............................... 56/327.1, 327.2, 56/121.4, 121.41, 121.42, 121.46, 121.44

[56] References Cited

U.S. PATENT DOCUMENTS

| | | | |
|---|---|---|---|
| 3,088,264 | 5/1963 | Sallee | 56/121.4 X |
| 3,497,013 | 2/1970 | Baker | 56/327.1 X |
| 3,503,196 | 3/1970 | Jarrett | 56/327.1 |
| 3,548,575 | 12/1970 | Lane | 56/327.1 |
| 3,690,049 | 9/1972 | Roberson . | |
| 3,704,576 | 12/1972 | Quick | 56/330 |
| 3,821,987 | 7/1974 | Shepardson et al. | 56/327.1 X |
| 3,858,660 | 1/1975 | Wadsworth | 56/327.1 X |
| 3,999,613 | 12/1976 | Porter | 56/327.1 X |
| 4,141,201 | 2/1979 | Christensen | 56/327.1 X |
| 4,147,017 | 4/1979 | Cortopassi et al. | 56/327.1 X |
| 4,244,165 | 1/1981 | McElwain | 56/327.1 |
| 4,584,826 | 4/1986 | Bettencourt et al. | 56/327.1 |
| 4,694,641 | 9/1987 | Porter | 56/327.1 X |
| 5,404,700 | 4/1995 | Kobuchi et al. | 56/327.1 |

FOREIGN PATENT DOCUMENTS

| | | |
|---|---|---|
| 0502789 | 3/1992 | European Pat. Off. . |
| 0606652 A1 | 12/1993 | European Pat. Off. . |
| 2406947 | 12/1977 | France . |
| 2663500 | 6/1990 | France . |
| 2352690 | 4/1975 | Germany .................................. 56/333 |
| 3135147 | 3/1983 | Germany . |

*Primary Examiner*—Anthony Knight
*Assistant Examiner*—Gary Grafel
*Attorney, Agent, or Firm*—Nixon & Vanderhye P.C.

[57] ABSTRACT

A system for picking cabbages includes at least one picking channel having structure for centering and straightening the cabbage plants. The structure is defined by two rotary disks that rotate in the processing direction relative to a flared intake of guides for supporting plants. The picking channel also includes structure for sectioning cabbage leaves and stems, which structure consists of one disk that completely cuts the path of each plant, and can be adjusted at a height relative to the ground. The overall unit is mounted on a frame that is equipped with structure for maintaining ground clearance.

41 Claims, 4 Drawing Sheets

SYSTEM FOR PICKING CABBAGES

BACKGROUND OF THE INVENTION

This invention relates to a system for picking cabbages.

The problem with cultivating cabbage is that to date it has not been possible to automate the picking of the latter without damaging the cabbages, which are very fragile; this then makes them unsuitable for consumption or for canning. Moreover, because at the beginning the stem of the cabbage may bend toward the ground and therefore shift with regard to the planting row, there is the danger that the dividing of the stems into sections may be done at inappropriate locations. The object of the invention is to overcome these drawbacks.

SUMMARY OF THE INVENTION

This object is achieved in that the system for picking cabbages has at least one picking channel, which consists of structure for centering and straightening the cabbage plants; support guides for the plants; and structure for sectioning cabbage leaves and stems at a height that can be adjusted relative to the ground, with the overall unit being mounted on a frame that is adjustably equipped for maintaining ground clearance.

According to another particular feature, above the sectioning structure, the system has structure for breaking leaves and blowing structure to remove leaves before the cabbages are conveyed by a conveyor belt.

The centering and straightening structure consists of two rotary disks that rotate in a processing direction relative to the flared intake of the support guides.

The disks are tilted in such a way that the axis of symmetry which coincides with the axis of rotation of the disks is, on the one hand, tilted toward the front and, on the other hand, toward the axis of symmetry of the picking channel.

The centering and straightening structure consists of two rotary truncated cones, with a small thickness, which rotate in the processing direction relative to the flared intake of the support guides and whose axis of rotation, which coincides with the axis of symmetry of the truncated cones, is tilted in such a way that the outside surface of the truncated cone is tangent, close to each channel, to a vertical plane that is parallel to the axis of symmetry of each channel.

An angle of inclination of the truncated cones axis of rotation in the two directions can be adjusted in a range of 0 to 30 degrees.

The support guides consist of two rails that converge from the axis of symmetry of the disks toward the support path which runs through a parallel section above which a rotary belt is driven in the processing direction.

The sectioning structure consists of a cutting disk that is driven in the processing direction and is arranged on each picking channel.

The structure for breaking leaves consists of a guide that is arranged parallel to the channel above the sectioning structure, and a group of pressure belts that are placed at the height of the guide are driven in rotation in the direction that is opposite to the direction of the sectioning wheel.

The belts are stretched between a first roller and a second roller, of which the first roller, which is arranged in front, can be adjusted in position, and a third so-called pressure roller which is arranged between the first roller and the second roller and close to the guide is mounted on elastic structure to define a segment of travel that is parallel to the channel and a segment of travel that converges between the first roller and the third roller.

Blowing structure is arranged under and on the side of the guide channel, in front of the outlet and/or at the outlet of the structure for breaking leaves, to remove the leaves before the cabbages arrive on the conveyor belt.

At the outlet of the conveyor belt the system has a second leaf-stripping device and a belt that lifts toward a storage hopper.

The picking system has a number of picking channels.

The system for adjusting the ground clearance consists of structure for detecting the distance to the ground and structure that acts on the support frame of the various structures of the system to vary the ground clearance as a function of the signal that is provided by the detection device.

The structure that acts on the support frame to vary the ground clearance is hydraulic.

These structures maybe mechanical.

The various disks, belts, and moving parts of the system that are mounted on the frame are actuated by a fluid that is supplied by at least one pump, which is driven by at least one motor.

The system for picking cabbages has at least one picking channel, which consists of structure for centering and straightening the cabbage plants; support guides for the plants; and structure for sectioning cabbage leaves and stems at a height that can be adjusted relative to the ground, with the overall unit being mounted on a frame that is adjustably equipped for maintaining ground clearance; with the centering and straightening structure consisting of two rotary disks that rotate in the processing direction relative to the flared intake of the support structure.

The centering and straightening structure consists of two belts, one stretched on either side of the channel, between a pulley that is integral in rotation with a rotary disk that rotates in the processing direction relative to the flared intake of the support structure, and a roller, with the belts narrowing into a V at the intake of the machine.

The system has structure for chopping and removing the upper portion of the cabbage leaves.

The structure for chopping and removing the upper portion of the cabbage leaves consists of at least one rotary cylinder that is located in the downstream direction and is equipped, on its peripheral surface, with sharp-edge picot pins in the processing direction, with the cylinder being arranged above the centering and straightening structure and with the axis of the cylinder being perpendicular to the axis of symmetry of the processing channel.

The disks consist of truncated cones which narrow toward the ground and are equipped on their peripheral surfaces with picot pins which are sharp-edged in the direction of rotation and extend perpendicularly to this peripheral surface.

Each centering and straightening disk is driven in rotation by a shaft, with which it is integral, with the shaft extending above the disk, whereby its axis coincides with the axis of rotation of the disk; each pulley is centered on the upper base of a disk, each roller is kept parallel to its pulley, and in the plane of the latter there is at least one arm, whereby each arm extends perpendicularly above the roller, then curves toward the disk and the back of the channel.

Each arm can pivot around an axis that is parallel to the drive shaft to move the roller and to vary the angle between the belt and the axis of symmetry of the channel, with the angle variation modifying the narrowing into a V that is traced by the two belts which are located on both sides of the channel.

The centering and straightening structure is tilted in such a way that the outside surface of the truncated cone of the centering and straightening disks is tangent, close to each channel, to a vertical plane that is parallel to the axis of symmetry of each channel.

The structure for breaking leaves consists of two series of driving belts, which are essentially parallel and are arranged symmetrically, on both sides of the channel, with each of the two series of driving belts being stretched between a first roller and a second roller, of which the first roller, which is arranged in front, can be adjusted in position, so that the plant is clamped between the two series of belts, with the two series of belts being driven in rotation in the downstream direction at various adjustable speeds.

The structure for breaking leaves consists of two series of driving belts, which are essentially parallel and are arranged symmetrically on both sides of the channel, with each of the two series of driving belts being stretched between a first roller and a second roller, of which the first roller, which is arranged in front, can be adjusted in position, in such a way that the plant is clamped between the two series of belts, with one of the two series of belts being driven in rotation in the direction that is opposite to the processing direction of the machine and with the other series of belts being driven in the processing direction, whereby the driving speed of each of the two series of belts is adjustable and the driving speed of the belt that rotates in the direction that is opposite to the processing direction is less than that of the belt which rotates in the processing direction.

A third pressure roller is arranged between at least one of two pairs of tensioning rollers, close to the axis of symmetry of the channel, with the pressure rollers being mounted on elastic structure to exert pressure on the plant by clamping it between the two series of belts.

The sectioning structure is arranged at the front of the machine, under the guide rails, with the system for picking including, behind the guide rails, structure for lifting cut cabbages up to the device for snapping and breaking leaves, with the picking system including blowing structure that is arranged on and/or under the conveyor belt, and with the blowing structure evacuating the cut leaves on an inclined belt, whereby the cabbage heads that arrive at the end of the conveyor belt fall onto a belt for evacuating cabbages and the evacuation belt of the cabbages is arranged under the two preceding belts.

The sectioning structure is arranged at the front of the machine, under the guide rails, with the picking system including structure for breaking leaves and blowing structure to remove the leaves before being conveyed by a conveyor belt, whereby the structure for breaking leaves and the blowing structure are arranged in the extension of the guide rails, at the back of the machine.

The structure for detecting the distance to the ground is optical and/or mechanical.

The structure for detecting the distance to the ground is hydraulic.

The structure for detecting the distance to the ground consists of a wheel of a gauge drum that rests on the ground.

BRIEF DESCRIPTION OF THE DRAWINGS

Other particular features and advantages of this invention will emerge more clearly by reading the description below, which refers to the accompanying drawings, where.

DETAILED DESCRIPTION OF PREFERRED EMBODIMENTS

Figure 1:
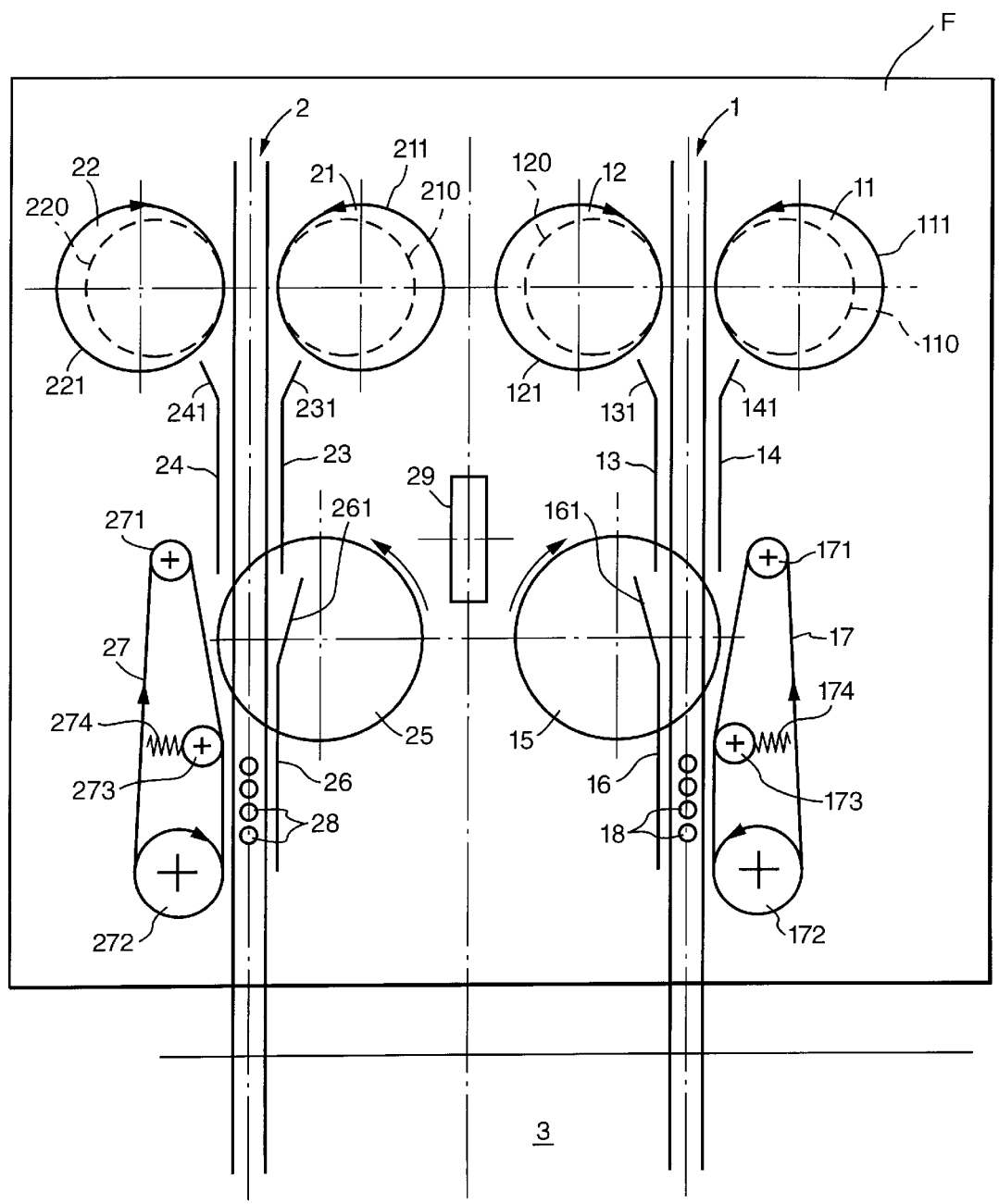
FIG. 1 shows a top view schematic diagram of the picking system.

The picking system according to the invention has a frame, that is mounted on lifting means relative to the ground and, in a variant of the invention, is articulated relative to a shaft. The frame also has a wheel or gauge drum (29), which is articulated relative to the frame so as to come into contact continuously with uneven spots on the ground. The movements of the gauge wheel are detected by mechanical or hydraulic means or the like to act on the lifting means of the frame to maintain an adjustable clearance between the devices for cutting plants and the ground. The gauge wheel (29) can be replaced by optical means that detects the contour of the ground and works with mechanical or hydraulic means or the like to act on the lifting means of the frame to maintain a constant clearance between the devices for cutting plants and the ground.

The frame supports at least one channel for processing the planting rows, but variants of the invention can have a number of channels, each processing a planting row. Thus, in FIG. 1, a first channel (1) and a second channel (2) can be seen.

Along the axis of symmetry of each channel is arranged, in the direction of travel of the machine, a first pair of disks (11, 12, 21, 22) that is driven in rotation in the processing direction toward the back of the machine and toward guide rails (13, 14 23, 24), one of whose ends is arranged above the disks. For the sake of simplicity, the term centering disks (11, 12, 21, 22) is used to refer to the truncated cones with a small thickness (2 to 15 cm, for example), whose axis of rotation is tilted in such a way that the outside surface of the truncated cone is tangent, close to each channel, to a vertical plane that is parallel to the axis of symmetry of each channel. Thus, a lower circumference (110, 120, 220, 210) of each truncated cone will vertically bring into alignment, close by the axis of symmetry of the channel with an upper circumference (111, 121, 221, 211).

Figure 2:
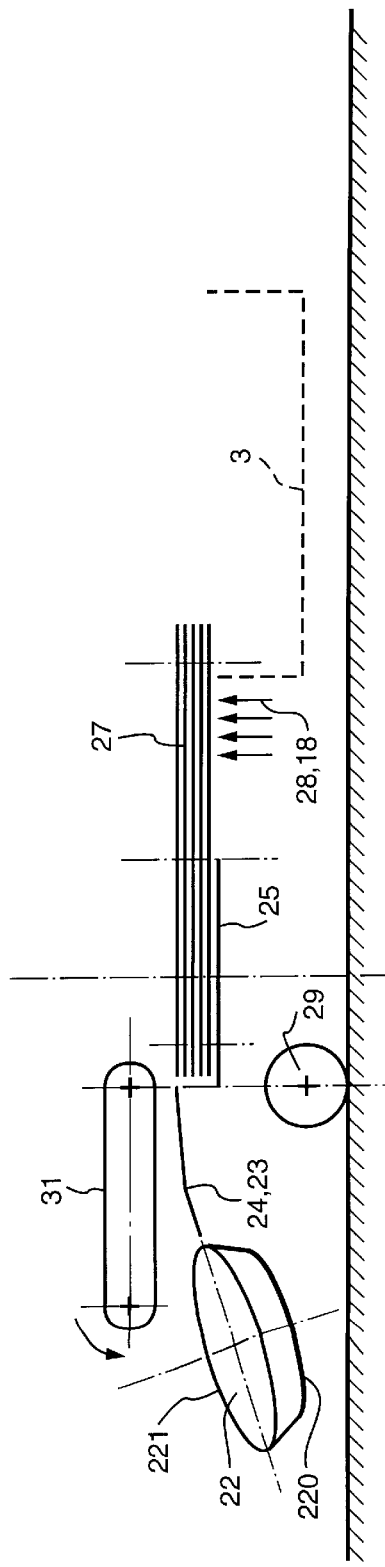
FIG. 2 shows a diagrammatic view of the side of the picking system of FIG. 1.

The rails (13, 14, 23, 24) have a flared portion at intake (131, 141, 231, 241), which begins essentially at the back of disks (111, 121). The flared portion (131, 141, 231, 241) is tilted in its front part at a tangent to the upper portions of centering disks (11, 12), as shown in FIG. 2. The positions of rails (13, 14) can be adjusted by known means to adapt to different types of harvested cabbages. Thus, as a non-limiting example, the rails (13, 14) can be translated vertically or tilted toward the front of the machine. In another variant (not shown), the flared portion can begin at the axis of symmetry that joins the two axes of the disks.

The disks are mounted in such a way that their axis of rotation is tilted, on the one hand, toward the front and, on the other hand, toward the axis of symmetry of each channel (1, 2). The angle of inclination of the axes of rotation can be adjusted by means that are known to one skilled in the art in a range between 0 and 30 degrees. The disks, by their rotation and their inclinations, make it possible to straighten the cabbage plants and to re-center them when the latter are staggered relative to the planting row. Rails (13, 14, 23, 24) then come to accomplish this centering and straightening of the plant and, by tightening the guides toward the axis of symmetry of the channel, bring the plant close to the sectioning disks of each channel (15, 25) which are driven in the processing direction.

The sectioning disks completely cut the path of each plant and are located below a device that makes it possible to break and snap the leaves of cabbage plants. The device consists of a support rail (16, 26), which begins with a flared portion (161, 261) above the sectioning disk and, opposite the rail at a certain distance, a number of driving belts (17, 27) that are stretched between two rollers (171, 172, 271, 272). The spacing of the support rails (16, 26) can be adjusted by known means to adapt to various diameters of cabbage stems. For example, elastic means (not shown) can ensure the adjustable spacing. The device also has a third roller (173, 273) that is arranged between the two rollers and close to the rectilinear and flexible portion, away from guide rail (16, 26). The intermediate roller (173, or 273) is mounted on elastic means (174, 274) to exert with the belt a pressure on the plant by clamping it against respective guide rail (16, 26). One of rollers (171, 172, 271, 272) is driven in rotation to drive the belts in the processing direction, i.e., in a rotational direction corresponding to the direction of rotation of the sectioning disks. The rotation of belt (17, 27) and the pressure of the latter on the plants exert a tearing force that causes the breaking of leaves that surround the cabbages.

A blowing device (18, 28) that consists of blowing nozzles, located behind sectioning disk (16, 26) and below and on the side of guides (26, 16) for breaking leaves, makes it possible to evacuate leaves before the plant is dumped onto a conveyor belt (3).

FIG. 2 shows a variant embodiment in which above each support guide (13, 14, 23, 24), the machine has a conveyor belt (31) that is driven in the processing direction on its lower face, which, in the embodiment shown, corresponds to the counterclockwise direction. The conveyor belt (31) is placed over and between guides (13, 23) of a height that is sufficient to hold the cabbages and facilitate their conveyance toward sectioning disk (10). At the end of conveyor belt (31), arranged in the driving direction, is also a second stripping system that makes it possible to complete stripping the cabbage of its leaves before dumping the cabbage on a lifting belt toward a storage hopper.

Figure 5:
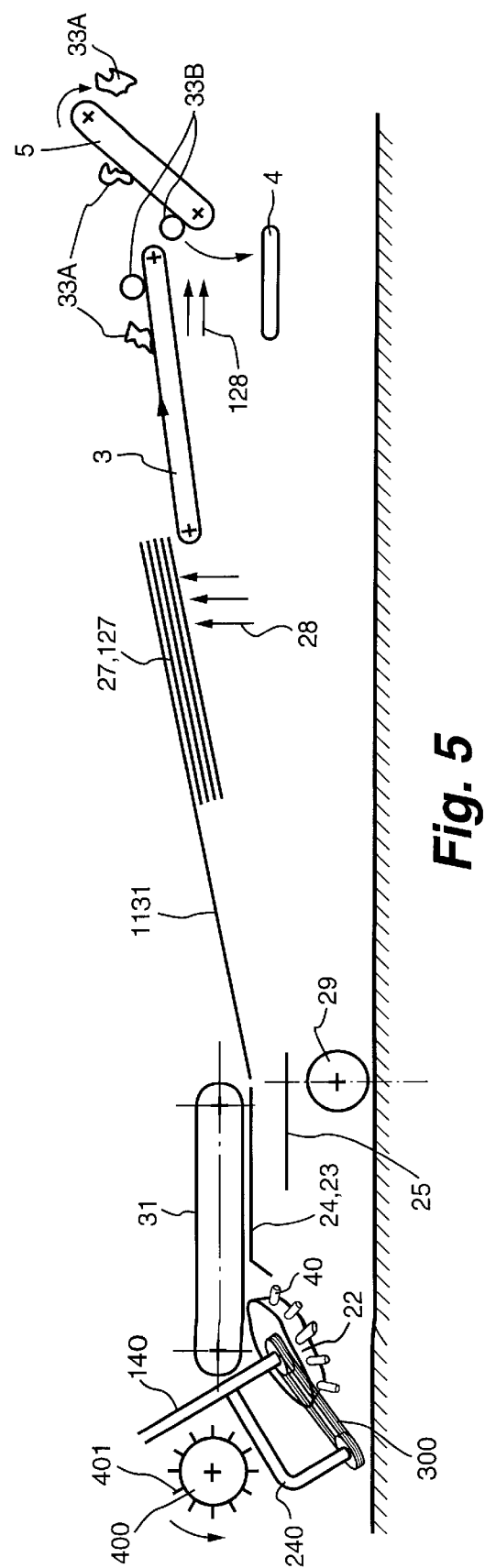
FIG. 5 shows a side view of the processing channel of FIG. 3.
Figure 3:
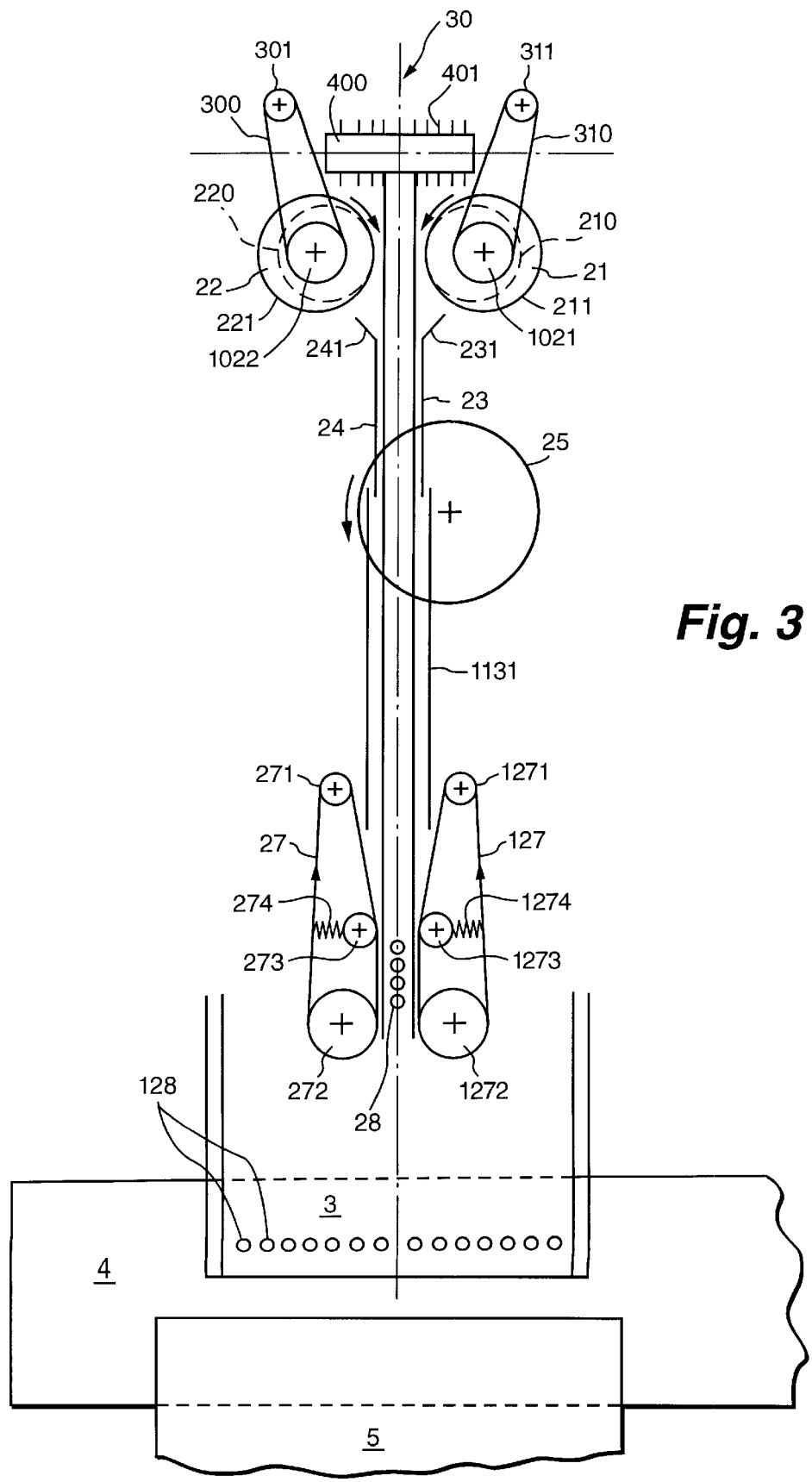
FIG. 3 shows a top view of a processing channel, in another embodiment according to the invention.

FIGS. 3 and 5 show a processing channel (30), in another embodiment of the invention. In these figures, the elements that are identical to those described above are indicated by the same numerical references. Along the axis of symmetry of channel (30) is arranged, a first pair of rotary centering disks (21, 22) consisting of truncated cones and arranged as above. Each of the disks (21, 22) has on its upper base a pulley (respectively 1021 and 1022) that is integral in rotation with the disk. The axis of rotation of the pulley coincides with the axis of rotation of disk (21, 22). Each pulley (1021, 1022) is associated with a roller (301, 311). Each of rollers (301, 311) is arranged symmetrically on each side of the channel, at the front of disks (21, 22). The two pulley-roller pairs each stretch a belt (300,310) from one side of channel (30). The two belts (300, 310) narrow into a V toward the intake of the machine. Disks (21, 22) are driven in rotation in a processing direction toward the plate (back) of the machine. Simultaneously, pulleys (1021, 1022), which are integral in rotation with the disks, work with rollers (301, 311) to transmit to belts (300, 310) a rotational motion in the downstream direction. Belts (300, 310) perform a first centering and straightening of cabbages that are tilted toward the ground and guide them toward disks (21, 22), which continue this centering and straightening.

Above belts (300, 310), the system for picking cabbages has means for chopping and tearing the upper portions of the cabbage leaves. The means for chopping the upper portion of the cabbage leaves consists of a rotary cylinder (400) whose peripheral surface is equipped with sharp-edged picot pins (401). Cylinder (400) is arranged between two belts (300, 310), with the axis of the cylinder perpendicular to the axis of symmetry of channel (30). Cylinder (400) is driven in rotation around its axis, in the processing direction of the machine, by known means. Picot pins (401) of cylinder (400), which are sharp-edged in the processing direction, ensure the tearing of the upper portion of cabbage leaves. The means (400, 401) for chopping the upper portions of cabbage leaves can be arranged at the very back of the machine. Likewise, the embodiment that is shown in FIGS. 1 and 2 can have means (400, 401) for chopping the upper portions of cabbages leaves. Advantageously, the peripheral surfaces of centering and straightening disks (21, 22) also have picot pins (40, FIG. 4) which improve the pick-up and the efficiency of guiding and straightening. Picot pins (40) consist of half-cylinders whose planar face is contiguous with a triangular section prism whose sharp-edged vertex is arranged in the direction of rotation of disk (21, 22). In addition to ensuring better pick-up, the picot pins (40) tear the leaves that surround the cabbage plants. Each tearing triggers the stripping of the cabbage by detaching the leaves and by embrittling other leaves which can be detached more easily by the leaf-stripping device that is located inside the machine. Picot pins (401) of cylinder (400) that perform the chopping and the removal of the upper portion of the cabbage leaves can be identical to picot pins (40) of disks (21, 22). Disks (21, 22) guide the cabbages toward guide rails (23, 24), which complete this centering and straightening.

Rails (23, 24), one of whose ends is arranged above the disks, have a flared portion at intake (231, 241). The flared portion (231, 241) begins at the backs of disks (21, 22) and is tilted toward the front of the machine. As in the embodiment of FIGS. 1 and 2, the positions of the rails (23, 24) can be adjusted by known means. Thus, for example, the rails (23, 24) can be translated vertically or tilted toward the front of the machine. The adjustment of position, which is carried out by the user, makes it possible for the machine to adapt to various types of cabbages to be harvested. The guides (23, 24) are then tightened toward the axis of symmetry of channel (30) and extend parallel to the channel, by providing for the parallel portion a spacing that is sufficient to allow the cabbages to be suspended by their heads.

As in the embodiment of FIG. 2, the processing channel has, above each guide (23, 24), a conveyor belt (31) (FIG. 5), which is driven in the processing direction on its lower face. Guides (23, 24) and conveyor belt (31) work together to bring the plant close to sectioning disk (25). The sectioning disk (25) is arranged behind guides (23, 24). The sectioning disk (25) can, however, also be located farther to the front on the machine, for example, close to the intake, under guide rails (23, 24). The variant for positioning sectioning disk (25) can also apply to the embodiment of FIGS. 1 and 2.

As in the example described above, sectioning disk (25) is driven in rotation in the processing direction, with its axis of rotation being parallel to the straightened cabbages. The disk (25) completely cuts the path of each plant, below the heads or hearts of the cabbages. After disk (25) cuts the base, the cut cabbages are driven by a lifting system (1131) up to the device to snap and break the leaves. Lifting system (1131) consists of two belts that encircle the cut cabbage and extend along channel (3) toward the back of the machine. Lifting system (1131) could be created by any other known means, for example, two guide rails that encircle the base of the cabbage under its head and work with one or more rotary belts in the processing direction. Lifting system (1131) drives the cut cabbages toward the top and back of channel (30) up to the device for snapping and breaking the leaves.

The device for snaping and breaking cabbage leaves consists of two series of driving belts, which are essentially parallel and are arranged symmetrically on both sides of channel (30) below the path of the cabbage heads. Each of the series of driving belts (27, 127) is stretched by two rollers, (271, 272) and (1271, 1272), respectively. The roller that is arranged in front (271, 1271) of each pair of tensioning rollers can be adjusted in position by known means. A third roller (273, 1273), a so-called pressure roller, is arranged between each of two pairs of tensioning rollers (271, 272; 1271, 1272) close to the axis of symmetry of channel (30). The pressure rollers (273, 1273) are mounted on elastic means, respectively (274) and (1274), in such a way as to exert pressure on the plant by clamping it between two series of belts (27, 127), with pressure rollers (273, 1273) being adjustable linearly in translation. One of the rollers of each pair of rollers (271, 272; 1271, 1272) is driven in rotation to drive each belt (27, 127) in the processing direction. Thus, on the same side of the axis of symmetry of the channel, all of the rollers rotate in the same direction of rotation as the centering disk that is located on this same side of the axis of symmetry.

Advantageously, one (127) of the two belts is driven at a speed that is lower than that of other belt (27). In this way, two belts (27, 127) drive the cabbage plants by exerting friction on their peripheral surfaces. The friction causes the breaking of the leaves that surround the cabbages. The difference in speeds between the belts, in addition to the shearing exerted on the cabbages, makes them turn on themselves as they move toward the back of the machine. This ensures efficient stripping of leaves over the entire periphery of cabbages. Of course, it is possible to vary the difference in the driving speeds of belts (27, 127). The difference in driving speeds of two belts (27, 127) will be adapted as a function of, for example, the speed of travel of the machine, to adjust the output of processed cabbages.

Likewise, it is possible to drive one of two belts (127) in the direction that is opposite to the processing direction of the machine and other belt (27) in the processing direction. The driving speeds of two belts (27, 127) will then be adjusted in such a way that the driving speed of belt (127) that rotates in the direction opposite to the processing direction is less than the driving speed of other belt (27). In this case, the rollers of the two sides of the axis of symmetry of the channel rotate in the same direction, which is the direction of rotation of one of two centering disks (21, 22). In this configuration, the friction that is exerted on the periphery of the plants is enhanced, and the progression of cabbages toward the back of the machine between the two belts is slowed down, i.e., the cabbages are subjected to the leaf-stripping for a longer time.

As in the embodiment described above, the processing channel has a blowing device, which consists of blowing nozzles (28) located on the axis of symmetry of the processing channel and under the device for breaking leaves. The blowing device (28) makes it possible to evacuate leaves before the plant is dumped on a conveyor belt (3) which is located at the back of channel (30) and parallel to the latter. The channel for processing cabbages has other blowing devices that consist of blowing nozzles (128) and are arranged above or below conveyor belt (3). The blowing nozzles (128) are arranged, for example, evenly over the entire width of and at the back of conveyor belt (3) to complete the evacuation of leaves on an inclined belt (5). Blowing (128) is directed toward inclined belt (5) and flattens cut leaves (33A) on the belt (5).

Reaching the back end of conveyor belt (3), cut cabbage heads (33B) drop onto another evacuation belt (4) that is arranged under two preceding belts (3, 5). In the embodiment of FIGS. 3 and 5, conveyor belt (3) and inclined belt (5), which are intended to evacuate the leaves, are essentially parallel to intended channel (30). Belt (4), which is intended for removing cabbages and is located under the two preceding belts, is approximately perpendicular to channel (30). This arrangement example is in no way limiting, however; belts (3, 4, 5) can be arranged in another manner known to one skilled in the art.

Figure 4:
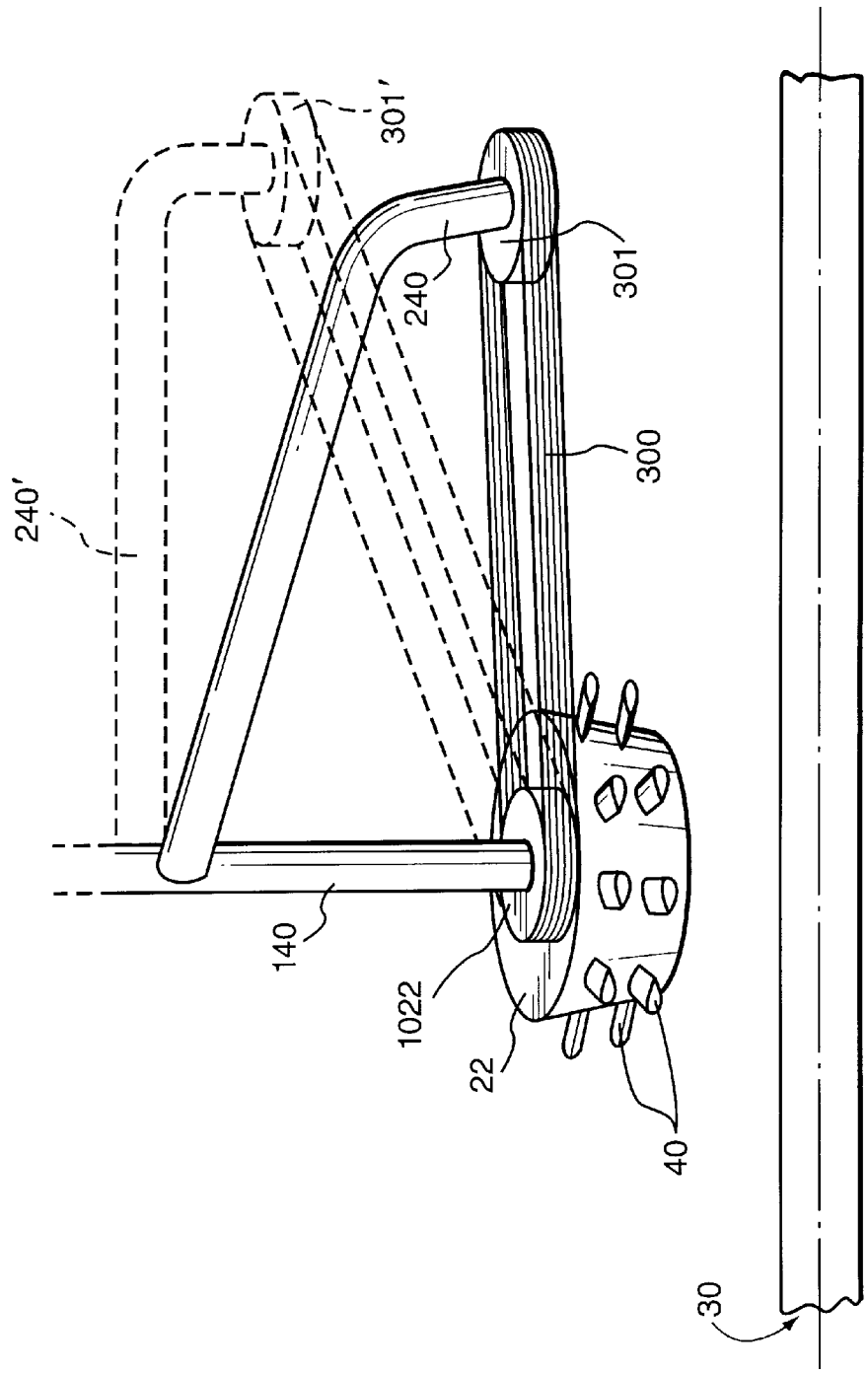
FIG. 4 shows a perspective view of a disk-roller pair which stretch a belt from one side of the processing channel in the picking systems of FIGS. 3 and 5.

FIG. 4 shows a view in perspective of a disk (22)-roller (301) pair which stretches a belt (300) from one side of processing channel (30). Only one disk-roller pair is shown; the same device is present, symmetrically, on the other side of channel (30). Centering and straightening disk (22) consists of a truncated cone that narrows toward the ground, i.e., downward. The peripheral surface of disk (22) is equipped with picot pins (40) which extend perpendicularly to the surface. Picot pins (40) consist of, for example, half-cylinders whose planar face is contiguous with a prism with a triangular section. The sharp edge of the triangular prism is arranged in the direction of rotation of disk (21, 22). Picot pins (40) are attached in a known manner to the peripheral surface of truncated cone (22). Picot pins (40) can also consist of conical teeth that are attached by their base to disk (21, 22).

The centering and straightening disk (22) is driven in rotation in a known way by a shaft (140) that is mounted in rotation in the frame of the machine with which it is integral. Shaft (140) extends above disk (22), with the axis of the shaft coinciding with the axis of rotation of disk (22). The upper base of disk (22) has a pulley (1022) that is centered on the base and is integral in rotation with disk (22). A belt (300) is stretched between the pulley (1022) and a roller (301). Roller (301) is kept parallel to pulley (1022) and in the plane of the latter by means of an arm (240) that is mounted on the frame of the machine by adjustable means that make it possible to adjust the angular position of arm (240) relative to the axis of harvesting channel (30). Roller (301) is mounted free in rotation on one end of the arm (240), with its axis of rotation parallel to the axis of rotation of centering disk (22). Arm (240) extends above roller (301), with its axis of symmetry coinciding with the axis of rotation of roller (301). Then, arm (240) is curved toward disk (22) and the back of channel (30).

Just as in the embodiment of FIG. 1, centering and straightening means (300, 310; 301, 311; 21, 22) can be tilted relative to the vertical. The inclination of the axes of rotation of disks (21, 22) and rollers (301, 311) can make it possible to direct the peripheral surface of the truncated cones of centering disks (21, 22). In particular, the peripheral surfaces of disks (21, 22) can be directed in such a way that they are tangent, close to each channel (30), to a vertical plane that is parallel to the axis of symmetry of each channel.

The angle of inclination of centering and straightening means (300, 310; 301, 311; 21, 22) can be adjusted by means known to one skilled in the art, in a range between 0 and 30 degrees. In particular, a means for unique and simultaneous adjustment of the inclinations of axes of rotations of disks (21, 22) and rollers (301, 311) can be provided on the same side of channel (30). It is also possible to vary the angle between belt (300) and the axis of symmetry of channel (30). The variation of this angle is accomplished by means known to one skilled in the art by having arm (240) pivot around an axis that is parallel to drive shaft (14) of disk (22). In this way, the narrowing into a V that is described by two pulleys (300, 310) which are located on both sides of channel (30) is varied.

Another position of the referenced arm (240') is shown in dotted lines in FIG. 4. In the other position, roller (301'), which is attached at the end of arm (240'), has been removed from channel (30) by the pivoting of arm (240) toward the outside of channel (30). Thus, the angle of narrowing into a V that is formed by two pulleys (300, 310) is larger. Of course, the centering and straightening device is not limited to this embodiment; other embodiments that are known to one skilled in the art fall within the scope of the invention.

It is also possible to produce a processing channel shown in FIGS. 3 and 5 without lifting system (1131). In this case, sectioning disk (25) can be arranged under the device for snapping and breaking cabbage leaves, as in the embodiment of FIG. 1. The variants that consist in introducing a lifting system (1131) into the embodiments of FIGS. 1 and 2 also fall within the scope of the invention.

The system according to the invention therefore makes it possible to ensure automatically the harvesting of cabbages by ensuring both the re-centering and straightening of plants without damaging the cabbage. The device also makes it possible to section at constant height relative to the plant and to break leaves which surround the cabbage without damaging the cabbage itself, which is particularly fragile. The processing direction is defined as the direction of rotation in which the plant is driven in the direction of conveyor belt (31).

The disks, belts, blowers, and other moving parts of the system are actuated either by a fluid that is supplied by one or more pumps which are driven by the power takeoff of the tractor or by electric motors or thermal engines or any other equivalent means.

Other modifications within the scope of one skilled in the art are also part of the spirit of the invention.

I claim:

1. A system for picking cabbage plants mountable to a tractor travelling between planting rows, comprising at least one picking channel processing a planting row and including:

means for centering and straightening the cabbage plants mounted at a front of the picking channel;

guides mounted adjacent the centering and straightening means supporting the plants;

means for sectioning cabbage leaves and stems at a height that can be adjusted relative to the ground; and a frame supporting the centering and straightening means, the guides and the sectioning means, wherein the guides are adjustable relative to the ground and relative to the centering and straightening means and the sectioning means, the frame including adjustable means for maintaining ground clearance.

2. A system for picking cabbages according to claim 1, wherein the system has, above the sectioning means, means for breaking leaves and blowing means for removing the leaves before the cabbages are conveyed by a conveyor belt.

3. A system for picking cabbages according to claim 1, wherein the centering and straightening means comprises two rotary disks that rotate in the processing direction relative to a flared intake of the guides.

4. A system for picking cabbages according to claim 3, wherein the rotary disks are arranged inclined in such a way that their axis of symmetry that coincides with the axis of rotation is tilted, on the one hand, toward the front and, on the other hand, toward the axis of symmetry of the picking channel.

5. A system for picking cabbages according to claim 1, wherein the centering and straightening means comprises two rotary truncated cones that rotate in the processing direction relative to a flared intake of the guides and whose axis of rotation, which coincides with the axis of symmetry of the rotary truncated cones, is tilted in such a way that the outside surface of the truncated cone is tangent adjacent each picking channel, to a vertical plane that is parallel to the axis of symmetry of each picking channel.

6. A system for picking cabbages according to claim 4, wherein the angle of inclination of the rotary disks axis of rotation in the two directions can be adjusted within a range of 0 to 30 degrees.

7. A system for picking cabbages according to claim 1, wherein the guides comprise two rails that converge from the axis of symmetry of the centering and straightening means toward a support path which extends through a parallel section above which a rotary belt is driven in the processing direction.

8. A system for picking cabbages according to claim 2, wherein the sectioning means comprises a cutting disk that is driven in the processing direction and is arranged on each picking channel.

9. A system for picking cabbages according to claim 2, wherein the means for breaking leaves comprises a support rail that is arranged parallel to the picking channel above the sectioning means and a group of pressure belts that are driven in rotation in a direction that is opposite to the direction of the sectioning means at the height of the support rail.

10. A system for picking cabbages according to claim 9, wherein belts are stretched between a first roller and a second roller, and a third pressure roller arranged adjacent the support rail between the first roller and the second roller, is mounted on elastic means to define a segment of travel that is parallel to the picking channel and a segment of travel that converges between the first roller and the third roller.

11. A system for picking cabbages according to claim 10, further comprising blowing means arranged under and on the side of the support rail, in front of the outlet and/or at the outlet of the means for breaking leaves, for removing the leaves before the cabbages arrive on a conveyor belt.

12. A system for picking cabbages according to claim 2, wherein at a outlet of the conveyor belt the system has a leaf-stripping device and a lifting belt toward a storage hopper.

13. A system for picking cabbages according to claim 11, wherein the system for adjusting the ground clearance comprises means for detecting a distance to the ground and means that act on the frame to vary the ground clearance as a function of a signal provided by the detection means.

14. A system for picking cabbages according to claim 13, wherein the means that act on the frame to vary the ground clearance from the sectioning disk are selected from among the following means: hydraulic means, mechanical means.

15. A system for picking cabbages according to claim 11, wherein the various disks, belts, and moving parts of the system mounted on the frame are actuated by a fluid that is supplied by at least one pump, which is driven by at least one motor.

16. A system for picking cabbages mountable to a tractor that has at least one picking channel processing a planting row and comprising:
- means for centering and straightening the cabbage plants mounted at a front of the picking channel;
- guides mounted adjacent the centering and straightening means in a processing direction, the guides supporting the plants;
- means for sectioning cabbage leaves and stems at a height that can be adjusted relative to the ground; and
- a frame supporting the centering and straightening means, the guides and the sectioning means, wherein the guides are adjustable relative to the ground and relative to the centering and straightening means and the sectioning means, the frame including adjustable means for maintaining ground clearance;
- wherein the centering and straightening means comprises two rotary disks that rotate in the processing direction relative to a flared intake of the guides.

17. A system for picking cabbages according to claim 1, wherein the centering and straightening means comprises two belts that are each stretched from respective sides of the picking channel, between a respective pulley that is integral with a respective one of rotary disks that rotates in the downstream direction relative to the flared intake of the guides and a roller, with belts narrowing into a V at the intake of the machine.

18. A system for picking cabbages according to claim 2, further comprising means for chopping and removing only upper portions of cabbage leaves.

19. A system for picking cabbages according to claim 18, wherein the means for chopping and removing the upper portions of cabbage leaves comprises at least one rotary cylinder in the processing direction and equipped, on its peripheral surface, with sharp-edged picot pins in the processing direction, wherein the cylinder is arranged above the centering and straightening means and wherein the axis of the cylinder is perpendicular to the axis of symmetry of the picking channel.

20. A system for picking cabbages according to claim 17, wherein the rotary disks comprise a pair of truncated cones which narrow toward the ground and are equipped on their peripheral surfaces with picot pins that are sharp-edged in the direction of rotation and extend perpendicularly to said peripheral surface.

21. A system for picking cabbages according to claim 17, wherein each of the rotary disks is driven in rotation by a shaft with which the rotary disk is integral, wherein the shaft extends above the rotary disk, whereby its axis coincides with the axis of rotation of the rotary disk, each pulley being centered on an upper face of the disk, and each roller is kept parallel to its corresponding pulley and in the plane of the latter, and there is at least one arm (240), whereby each arm extends perpendicularly above the roller, then curves toward the disk.

22. A system for picking cabbages according to claim 21, wherein each arm is pivotable around an axis that is parallel to the shaft to move the roller and to vary an angle between the belt and the axis of symmetry of the picking channel wherein said angle variation modifies the narrowing into a V that is defined by the two belts which are located on both sides of the picking channel.

23. A system for picking cabbages according to claim 15, wherein the centering and straightening means comprises truncated cones that are tilted in such a way that outside surfaces of the truncated cones are tangent to a vertical plane that is parallel to the axis of symmetry of each picking channel, respectively.

24. A system for picking cabbages according to claim 1, wherein the means for breaking leaves comprises two series of driving belts, which are essentially parallel and arranged symmetrically, on both sides of the picking channel wherein each of said two series of driving belts is stretched between a first roller and a second roller, of which the first roller, which is arranged in front, can be adjusted in position, in such a way that the plant is clamped between the two series of belts, and wherein the two series of belts are driven in rotation in the processing direction with adjustable speeds.

25. A system for picking cabbages according to claim 2, wherein the means for breaking leaves comprises two series of driving belts, which are essentially parallel and arranged symmetrically on both sides of the picking channel, wherein each of said two series of driving belts is stretched between a first roller and a second roller, of which the first roller, which is upstream of the second roller, can be adjusted in position, in such a way that the plant is clamped between the two series of belts, and wherein one of the two series of belts is driven in rotation in a direction that is opposite to the processing direction and the other of the two series of belts is driven in the processing direction, whereby the driving speed of each of the two series of belts is adjustable and the driving speed of the belt that rotates in the direction opposite to the processing direction is less than the speed of the belt that rotates in the processing direction.

26. A system for picking cabbages according to claim 24, wherein a third pressure roller is arranged between at least one of the first and second rollers, wherein said pressure roller is mounted on elastic means to exert pressure on the plant by clamping it between the two series of belts.

27. A system for picking cabbages according to claim 1, wherein the sectioning means is arranged under the guides, and wherein the system has means for lifting cut cabbages for snapping and breaking leaves, and blowing means for evacuating cut leaves on an inclined belt, whereby cabbage heads, after reaching an end of a conveyor belt, fall onto a waste belt for removing cut cabbages.

28. A system for picking cabbages according to claim 1, wherein the sectioning means is arrange at a front of the system, under the guides, and wherein the system has means for breaking leaves and blowing means for removing the leaves before being conveyed by a conveyor belt, wherein the breaking means and the blowing means are arranged in an extension of the guides, at the back of the system.

29. A system for picking cabbages according to claim 13, wherein the means for detecting the distance to the ground is selected from among the following means: optical means, mechanical means, hydraulic means.

30. A system for picking cabbages according to claim 13, wherein the means for detecting the distance to the ground comprises a wheel or a gauge drum that rests on the ground.

31. A cabbage picking apparatus comprising:
- a channel frame mountable to a tractor;
- a pair of rotary disks supported by the channel frame and positionable on opposite sides of a row of cabbage plants, the rotary disks centering and straightening the cabbage plants and rotating in a processing direction;
- a pair of guide rails supported by the channel frame and positioned adjacent the rotary disks, respectively, the guide rails being positioned to receive the cabbage plants from the rotary disks and support the cabbage plants along the processing direction; and a sectioning disk supported by the channel frame and positioned adjacent the guide rails, the sectioning disk rotating in a direction corresponding to the processing direction and sectioning leaves and stems of the cabbage plants.

32. A cabbage picking apparatus according to claim 31, further comprising a driving belt supported by the channel frame and positioned in a facing relationship with the sectioning disk, the driving belt rotating in the processing direction and cooperating with the sectioning disk to section the leaves and stems of the cabbage plants.

33. A cabbage plant picking apparatus according to claim 32, further comprising an intermediate roller disposed within the driving belt and exerting pressure on the driving belt via an elastic member toward the sectioning disk.

34. A cabbage plant picking apparatus according to claim 31, further comprising a support rail supported by the channel frame and positioned adjacent the guide rails, the support rail breaking leaves of the cabbage plants.

35. A cabbage plant picking apparatus according to claim 31, wherein the guide rails define a flared portion at an upstream end thereof.

36. A cabbage plant picking apparatus according to claim 31, wherein the rotary disks comprise truncated cones.

37. A cabbage plant picking apparatus according to claim 36, wherein an outside surface of each of the truncated cones is tangent to a plane that is parallel to an axis of symmetry of the channel frame.

38. A cabbage plant picking apparatus according to claim 36, wherein an axis of rotation of each of the truncated cones is tilted with respect to the processing direction.

39. cabbage plant picking apparatus according to claim 31, wherein an axis of rotation of each of the rotary disks is tilted with respect to the processing direction.

40. A cabbage plant picking apparatus according to claim 31, further comprising a blowing mechanism supported by the channel frame and positioned adjacent the sectioning disk, the blowing mechanism evacuates leaves before the cabbage plants are processed further.

41. A cabbage plant picking apparatus according to claim 31, further comprising a conveyor belt positioned adjacent the sectioning disk, the conveyor belt conveying sectioned cabbage plants.

* * * * *